US012783710B2

(12) United States Patent
Cheng-Shorland et al.

(10) Patent No.: US 12,783,710 B2
(45) Date of Patent: Nov. 3, 2026

(54) DOCUMENT SCREENSHOT PREVENTION AND WATERMARKING SYSTEM, AND APPLICATIONS THEREOF

(71) Applicant: ShelterZoom Corp., New York, NY (US)

(72) Inventors: Chao Cheng-Shorland, New York, NY (US); Amir Homayoun Alishahi, New York, NY (US)

(73) Assignee: SHELTERZOOM CORP., New York, NY (US)

( * ) Notice: Subject to any disclaimer, the term of this patent is extended or adjusted under 35 U.S.C. 154(b) by 0 days.

(21) Appl. No.: 19/086,965

(22) Filed: Mar. 21, 2025

(65) Prior Publication Data

US 2026/0288990 A1 Sep. 24, 2026

(51) Int. Cl.
*G06F 21/62* (2013.01)

(52) U.S. Cl.
CPC ................................ *G06F 21/6218* (2013.01)

(58) Field of Classification Search
CPC ................................................... G06F 21/6218
See application file for complete search history.

(56) References Cited

U.S. PATENT DOCUMENTS

2006/0047748 A1 3/2006 Kelso et al.
2008/0089552 A1 4/2008 Nakamura et al.
2015/0373021 A1 12/2015 Tussy
2019/0340341 A1 11/2019 Fleck et al.
2020/0145384 A1 5/2020 Chauhan
2021/0049304 A1 2/2021 Thyagaraj et al.
2022/0100825 A1 3/2022 Groth et al.
2023/0237173 A1* 7/2023 Ghiold .................... G06F 21/31
726/27
2025/0181226 A1* 6/2025 Graziani ............... G06T 1/0021
2025/0310378 A1* 10/2025 Agrawal ................ H04L 63/20

OTHER PUBLICATIONS

International Search Report and Written opinion directed to International Application No. PCT/US2026/020379, mailed Jun. 16, 2026; 27 pages.

* cited by examiner

*Primary Examiner* — Benjamin A Kaplan
(74) *Attorney, Agent, or Firm* — Sterne, Kessler, Goldstein & Fox P.L.L.C.

(57) ABSTRACT

Disclosed herein are system, method, and computer program product aspects for managing the dissemination of documents using screenshot prevention and/or watermarking. An example implementation may enable a screenshot protection action of a document. The implementation may then transmit the document with the enabled screenshot protection action to the user device. In response to receiving a consent from the user device, the implementation may then extract a user identifier of the user device in which the consent indicating that the user device will conform to the screenshot protection action when viewing or accessing the document. The implementation may then generate a watermark in real-time based on the consent from the user device, the user identifier of the user device, and the screenshot protection action of the document. The implementation may then insert the watermark into the document.

20 Claims, 13 Drawing Sheets

100B

DOCUMENT SCREENSHOT PREVENTION AND WATERMARKING SYSTEM, AND APPLICATIONS THEREOF

BACKGROUND

As individuals, businesses, and governments interact, parties often exchange many documents to communicate or transfer files and records from one party to another, or from one system to another. These documents may include confidential data or information. As documents are disseminated, protecting sensitive information from unauthorized access or disclosure while continued spread of the documents with data confidentiality concerns can be challenging. This may become more difficult when there are multiple parties viewing or modifying the document. For example, a document owner may send a document to an intended recipient, but the intended recipient may further forward that document to another individual. In this case, the document owner may be unable to control or keep the document as confidential during the continued distribution of the document beyond the party originally intended to receive the document.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1A:
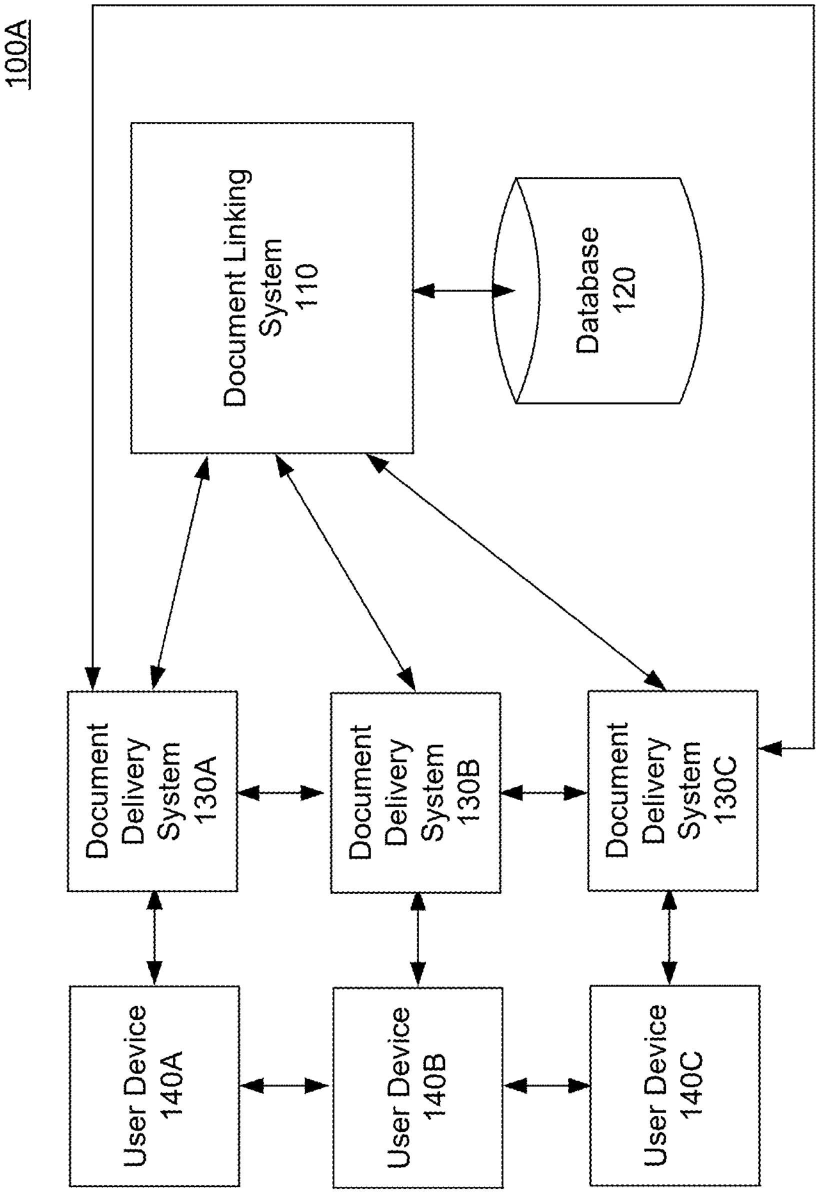
FIG. 1A is a block diagram illustrating a document management environment 100A, according to aspects of the present disclosure.

Disclosed herein are system, apparatus, device, method and/or computer program product embodiments, and/or combinations and sub-combinations thereof, for managing the dissemination of documents using screenshot prevention and/or watermarking.

The embodiments disclosed herein may provide various delivery or system integration methods, including but not limited to, a plugin or widget into a document delivery system such as an email system, a business application, a social media channel, a website, and/or a chat or messaging system. Plugins and widgets described herein are examples of delivery or system integration methods, and the embodiments can apply to all types of document management and file transfer systems, regardless of how the file is triggered. In some aspects, by using the plugin or widget, a user device accessing the document delivery system may use a front-end user interface for providing a document to a back-end system for managing documents. The front-end interface may be accessed via a plugin or widget integrated into an application managed by a document delivery system. For example, the application may be a messaging application managed by a messaging system. By integrating the plugin or widget into various document delivery systems, user devices using those document delivery systems may gain access to the back-end management of documents. This back-end system may allow a user device to manage document creation, document uploads, document permissions, document modifications from different parties, and/or view a document flow tracking the dissemination of the document. Based on this flow, a document owner may modify and/or adjust permissions corresponding to the document.

The back-end system may be a document linking system that generates and/or manages document links. In some embodiments, the document linking system may also use a document token process. As will be further explained below, document tokens may be used to represent ownership and/or permissions corresponding to a document. In some embodiments, a document token may be a non-fungible token (NFT). The document linking system may receive an uploaded document and/or aid the user device in generating a document for dissemination. Upon receiving or generating a document, the document linking system may generate a document token corresponding to the document. As will be further described below, the document token may be a hash of the document and/or may be used to track document modifications, acknowledgments, sharing, copying, and/or permissions. Upon generating the document token, the document linking system may transmit the document tokens as links to document delivery systems. The document delivery systems may then embed the document links into messages for a user device to transmit. This may allow user devices to disseminate documents managed by the document linking system.

An intended recipient may then receive the document link via a document delivery system corresponding to the intended recipient. Upon accessing the link, the user device may supply credentials to the document linking system. In some embodiments, the document delivery system implementing the plugin from the document linking system may implement a single sign-on process to provide credentials to the document linking system. The document linking system may track or log the access to the document based on the document link. This tracking may be performed using a document flow data structure. The document owner may view this document flow data structure to identify downstream individuals accessing the document and/or to manage permissions for these downstream individuals. In this manner, the document owner may view and/or manage downstream permissions even if a document link is distributed beyond an initial intended recipient. In some embodiments, the document flow data structure may also track document participants and/or events such as creation, viewing, signing, sharing or downloading. The document flow data structure may also track times, dates, and/or locations like the latitude and longitude of digitally transmitted information. For example, the document flow data structure may track global positioning coordinates related to a document and/or a document interaction event.

As documents are disseminated between the sender device and the intended recipient device, protecting confidential or sensitive information from unauthorized access or disclosure of the document can be challenging. Assuming the sender and recipient device both follow the data confidential policy, technological challenges involved within traditional document linking system may include data leakage or any privacy issues when there are additional parties viewing or modifying the documents, especially when the documents with sensitive data may need to be distributed outside the sender or receiver user devices. For example, a document owner (sender device) may send a document to an intended recipient, but the intended recipient may further forward that document to another individual (which does not sign the data confidentiality agreement). In this case, the document owner may be unable to control or keep the document as confidential during the continued distribution of the document beyond the party originally intended to receive the document.

These privacy issues may also include, but are not limited to data breaches, improper data or information handling, and/or lack of verification procedures while disseminating the documents between different parties. For example, if any of the sender or the receiver devices storing the confidential data are compromised, hackers could access the sensitive details of these user devices. Without adequately encrypting confidential information during document transmission or storage, traditional document linking systems could leave it vulnerable to unauthorized access.

To tackle the technological challenges related to data confidentiality or privacy concerns, the document linking system is used as an intermediary system within the document's dissemination and provides document modifications (e.g., watermarking the documents) or enables any document protection actions (e.g., screenshot prevention) to prevent the sensitive data information in the document from being shared or copied. Instead of establishing a direct communication between the sender device, the recipient device, and any additional individual user devices, the document linking system mediates the document being disseminated. In some aspects, the document linking system may preemptively modify the document or hide the privacy information consistent with the data confidential policies agreed upon by different parties.

As a mediator, the document linking system allows the sender device to control how their personal data is accessed, encrypted, and used by different recipient devices while maintaining privacy by not directly sharing their raw data with each individual recipient device; essentially, it acts as a trusted middleman (with sufficient encryption and verification procedures) to manage data access and usage on behalf of the sender device, ensuring privacy controls are in place. The intermediary document linking system may anonymize or de-identify data before sharing it with the recipient devices, further protecting user privacy. The intermediary document linking system may also manage access permissions, only allowing specific data to be shared with authorized recipient devices based on any parameters defined by the sender devices. In addition, by using the intermediary document linking system, sender devices may be informed about how their data is being accessed and have the ability to monitor and manage the data sharing. The document linking system may associate disclosure and agreements with the sender and recipient device in a privacy preserving way to understand, detect, and/or correct any violations of the data confidential agreements.

Furthermore, the document linking system, to address the security or privacy concerns, may manage documents in a database and generate links to database addresses. In some embodiments, the database may be a blockchain and the document linking system may manage documents using document tokens via a blockchain. Blockchain described herein is an example of how database or document tokens may be used and/or managed, but the embodiments can also function on any non-blockchain-based systems. The document tokens may correspond to generated documents and/or modifications of documents. The document tokens may be used with the blockchain to provide proof of document creation or modification. For example, on either a public or private blockchain, new documents and/or modifications may be tracked as updated blocks and/or code executed on a blockchain using smart contract functions.

The publication to a blockchain may provide security and trust that modifications are immutable. Further, distributed ledger technology may provide a streamlined manner of tracking documents and/or modifications and presenting these documents to parties communicating and/or editing a document. As will be further described below, the embodiments described herein further provide faster and more efficient back-end processing for blockchain operations. In particular, the use of asynchronous calls to the blockchain may provide increased speed and may avoid delays related to blockchain transaction times.

The immutability of the blockchain may preserve documents and/or modifications to documents. Further, utilizing encryption may maintain confidentiality of sensitive information when disseminating documents. This may be useful for when a document is a contract. By managing these documents using a blockchain, parties to a contract may present offers and counteroffers that may be relied upon by other parties in a more trusted manner. For documents, the document linking system may streamline a document delivery in a manner that preserves confidentiality while maintaining a high degree of trust. Parties using the document linking system may provide digital signatures or acknowledgments as interactions with received documents. In this manner, the document linking system may facilitate the signing of a document. In some embodiments, the document generation and/or dissemination may be performed in a decentralized manner and/or may provide a decentralized document file system.

In some embodiments, the document linking system may track access and/or modifications of the document in which the modifications may be to the text of the document. In some embodiments, the modifications may be an acknowledgement and/or a signature corresponding to the document. For example, the acknowledgement may acknowledge receipt of the document. In this manner, dissemination may occur to downstream users while keeping a record of users accessing and/or modifying the document. Integrating this process with existing document delivery systems may also provide a more streamlined process for managing, sharing, and/or modifying documents.

In some embodiments, a plugin, widget, and/or graphical user interface may be implemented into document delivery systems to streamline the document generation, document delivery, and document dissemination process. The plugin may allow a user to quickly generate a document using fewer GUI interactions. The reduction of interactions may aid in reducing wasted computational resources or unnecessary web navigation.

Further, the plugin may aid in reducing network traffic due to the reduced number of interactions. Similarly, the document upload and/or creation process while delivering document links may deliver documents in a similar and compact manner. Users accessing the link may access and/or interact with various documents via a number of different document delivery systems. In this manner, the document linking system may also reduce the number of user interactions and computational transactions while also reducing network traffic.

In summary, this disclosure is directed to a document linking system for seamlessly integrating data confidential policies, security and privacy preservation into the document dissemination between a sender device and a receiver device. With the help of the document linking system, sender devices can track access, and modifications of the document in which the modifications may be to the text of the document, such that to prevent or restrict unauthorized access or sharing of the document. Also, using the document linking system as a trusted middleman, user devices may retain ownership and control over their data, deciding which information can be accessed by different other user devices and for what purposes. As such, the document linking system may manage data access and usage on behalf of the user device, ensuring privacy controls are in place during the document dissemination. These and other aspects of the present disclosure will be described in further detail below with respect to the accompanying drawings.

FIG. 1A is a block diagram illustrating a document management environment 100A, according to aspects of the present disclosure. Document management environment 100A may include document linking system 110, database 120, document delivery systems 130, and/or user devices 140. Document linking system 110 may include one or more servers and/or databases 120 that may communicate with document delivery systems 130A to 130C. Document delivery systems 130 may be servers and/or databases providing messaging platforms for user devices 140. For example, document delivery systems 130 may be email providers, social media providers, text message or SMS providers, blogs, and/or other systems that facilitate the delivery and/or receipt of messages for user devices 140. User device 140 may be a computer, laptop, tablet, phone, and/or other device that may access the Internet and/or access a document delivery system 130.

As will be further described below, document linking system 110 may provide software instructions, executable code, a software as a service (SaaS), and/or other programming to the document delivery systems 130 to provide a plugin or widget to be displayed on a graphical user interface. This plugin or widget may be integrated into a messaging service provided by a document delivery system 130. A user using a user device 140 may select this plugin or widget to access the document link and/or token generation managed by document linking system 110. User device 140 may provide a document to document linking system 110 via the plugin or widget. Document linking system 110 may generate document links and/or tokens based on documents received from or created by user devices 140. In some aspects, document linking system 110 may preserve the document tokens using database 120. In some aspects, database 120 may be a blockchain. After generating a document link and/or token, document linking system 110 may provide the document link and/or token to a document delivery system 130. This link may be embedded into a message being drafted by a user device 140. A document delivery system 130A may then provide the message including the document link to another document delivery system 130B to provide access to the document. As will be further explained below, document linking system 110 may track and/or log user credentials corresponding to user devices 140 that access, view, acknowledge, sign, and/or modify the document corresponding to the document link.

In some aspects, user device 140A may be used to deliver a document to user device 140B. User device 140A may use document delivery system 130A to send the document via a message. Upon accessing document delivery system 130A, a user may provide a user selection on a GUI provided by document delivery system 130A to select the plugin or widget corresponding to document linking system 110. Based on this selection, document linking system 110 may generate another GUI allowing user device 140 to generate or supply a document for delivery as a document link.

Document linking system 110 may provide a front-end user interface to allow users to create, manage, edit, and/or modify documents. The user interface may be a GUI that may be accessed and/or displayed on a user device 140. Upon selecting the plugin or widget, user device 140 may use an application programming interface (API) to communicate with document linking system 110.

As will be further explained below, document linking system 110 may provide a front-end GUI including GUI elements allowing a user to create documents, modify documents (e.g., watermarking), manage document permissions (e.g., screenshot, sharing, or downloading of a document), generate links and/or messages corresponding to documents, manage document modifications from other parties, manage a digital wallet, manage user account information and/or account roles, and/or other document interactions. In some aspects, document linking system 110 may facilitate the incorporation of GUI elements into a GUI implemented by document delivery system 130 to allow users to access the operations provided by document linking system 110. For example, document linking system 110 may provide a plugin or widget that may be incorporated, integrated, or overlaid onto a GUI generated by a document delivery system 130 to provide document linking and/or document token functionality.

In some aspects, document linking system 110 may provide executable code and/or software instructions to a document delivery system 130 to generate an icon and/or button allowing a user to create or upload a document. The user may interact with the icon or button via a selection, press, or click on the GUI generated by the document delivery system 130. In response to this interaction, the document delivery system 130 may communicate with document linking system 110 to provide a user device 140 with access to the document creation GUI supplied by document linking system 110. As will be further described with reference to at least FIG. 3A, the document creation GUI may allow a user to create a new document and/or upload a document. The document creation GUI may also include optional parameters that the user may select. These parameters may indicate permissions for downstream users accessing the document. For example, the document owner may designate that the downstream recipient is to sign or acknowledge the document. In some aspects, the parameters may designate the document as shareable and/or downloadable. In some aspects, the document owner may also turn on advanced protection to block a screenshot of the document, to watermark the document with recipient consent and email, and to mark a copy of the document as, for example, "For Recipient Use Only" to prevent sharing.

In some aspects, the document provided by user device 140 may be a contract or an offer document used in a contractual negotiation process. Using the GUI provided by document linking system 110, a user may designate the contract as a document to be signed or acknowledged. In some aspects, other documents may include messages, attachments, clauses, online documents, smart documents, tokenized documents, contracts, smart contracts, tokenized contracts, agreements, records, files, books, archives, social media posts, news article, audio files, video files, website links, and/or other types of digital documents.

Upon receiving a document, document linking system 110 may generate a document link and/or token corresponding to the received document. As will be further explained below, document linking system 110 may store an encrypted version of the document and/or create a link to the encrypted version of the document. Document linking system 110 may also generate a cryptographic hash of the document. Using this information along with other information such as an owner identification and/or other metadata, document linking system 110 may create a document token corresponding to the document. The document token may represent ownership of the document and/or may be transmitted to a digital wallet corresponding to the document owner. Document linking system 110 may use the document token in future operations to determine access and/or modification permissions.

After generating the document token, document linking system 110 may provide the document token to the corresponding document delivery system 130 as link. In some aspects, document linking system 110 may generate a link without using a document token. The link may be to an address of the database 120 storing the document. The link generated by document linking system 110 may be embedded into a message being drafted by a user device 140. A user device 140A may indicate document delivery system 130A to transmit the message including the document link to an intended recipient. For example, this may be a user corresponding to user device 140B and using document delivery system 130B. In some aspects, user device 140A may designate the recipient using an email address, social media identification, and/or other electronic identification of the intended user. Document delivery system 130A may then deliver the message to document delivery system 130B.

Upon receiving the message with the document link, user device 140B may access the document link. For example, document delivery system 130B may generate an Internet browser or application view allowing the user of user device 140B to select the document link. After selecting this link, user device 140B may connect to document linking system 110 to access the corresponding document. User device 140B may interact with the document based on the permissions set by user device 140A. These permissions may be associated with the document link. For example, the permissions may include viewing the document, acknowledging receipt of the document, signing the document, downloading the document as a file, sharing the document, and/or modifying (e.g., watermarking) the document. User device 140B may interact with the document according to this permission.

In some aspects, to access the document, user device 140B may supply user credentials to document linking system 110. For example, if user device 140B has an account corresponding to document linking system 110, user device 140B may supply these credentials. In some aspects, document delivery system 130B may supply the credentials on behalf of user device 140B. For example, document delivery system 130B may interact with document linking system 110 via a single sign-on process. In this manner, document linking system 110 may receive credentials corresponding to user device 140B attempting to access the document. As will be further explained below, this may also occur if another user device 140C also attempts to access the document link.

In some aspects, document linking system 110 may record and/or log the access of the document link. Document linking system 110 may log this access in a document flow data structure. The document flow data structure may be stored in memory of document linking system 110. The document flow data structure may reflect a timeline of interactions with the document. The document flow data structure may track user credentials corresponding to an interaction, a timestamp, and/or a type of interaction. For example, if the user is asked to acknowledge or sign the document, the document flow data structure may track the user credentials and/or time that the document has been acknowledged and/or signed. As will be further described below, the document owner may manage the document flow data structure to track and/or manage access to the document as the document link is disseminated to additional user devices 140.

For example, the document owner may track and/or manage permissions if user device 140B forwards the document link to user device 140C. In this case, when user device 140C accesses the document link via document delivery system 130C, user device 140C and/or document delivery system 130C may also provide credentials to document linking system 110 to access and/or modify the document. Document linking system 110 may track and/or log the access in a similar manner. The document owner may use user device 140A to view the document flow data structure and view the access and/or modification performed by user device 140C. The document owner may further manage permissions specific to user device 140C. In some aspects, even though user device 140A has not directly transmitted the document link to user device 140C, user device 140A may still view a record of the access and/or modification.

User device 140A may similarly manage permissions related to this access. These permissions may be managed using document linking system 110. In this manner, even if the document link is disseminated to different user devices 140, the permissions may still be controlled and/or altered without modifying the document link. Based on this modification, the document link may be disseminated and user device 140A may tailor permissions specific to recipients attempting to access the document. In this manner, user device 140A may be able to control and/or modify permissions corresponding to recipients that the user device 140A has not designated or may not be aware of when initially transmitting the document link.

Based on this configuration, document linking system 110 may provide a decentralized manner for disseminating documents while retaining control and/or permissions related to downstream users. Document linking system 110 may provide a decentralized file system for users of document delivery systems 130. By integrating a plugin or widget into these document delivery systems 130, user devices 140 may access document linking system 110 to disseminate documents via messages. Document linking system 110 may securely manage these documents and provide control over downstream access and/or modification of the documents.

In some aspects, document linking system 110 may include object storage, a web service interface, storage for Internet applications, and/or cloud computing and/or storage. In some aspects, document linking system 110 may use a peer-to-peer network and/or protocol for storing and/or sharing data in a distributed file system. For example, document linking system 110 may use content-addressing to uniquely identify files in a global namespace to network user devices 140. In some aspects, document linking system 110 may use the InterPlanetary File System (IPFS) protocol and/or servers such as Amazon S3®.

Document linking system 110 may include an interface with database 120. Database 120 may be a private or public blockchain. Document linking system 110 may use one or more smart contract functions to interface and/or publish data to a blockchain. The smart contract functions may include protocols to digitally facilitate, verify, and/or enforce transactions. The transactions may be trackable and irreversible. As will be further described below, document linking system 110 may interface with database 120 to store data representing documents and/or modifications to documents. This data may include a cryptographic hash of a document and/or a link to a human-readable representation of the document.

In some aspects, document linking system 110 may also manage processing tokens used to interact with database 120 and/or a blockchain. For example, document linking system 110 may manage digital wallet information related to cryptocurrencies. Document linking system 110 may use and/or consume digital currencies to execute transactions to a blockchain. For example, document linking system 110 may also manage gas, transaction, and/or mining fees used to conduct a transaction, execute a blockchain contract, and/or publish data onto a blockchain in a block. As will be further explained below, document linking system 110 may also manage document tokens which may represent ownership and/or permissions for documents and/or document modifications. Document linking system 110 may facilitate the publishing of document data to the blockchain and/or may remove processing tokens from an account corresponding to a digital wallet to perform the publishing.

To manage documents, document linking system 110 may publish the cryptographic hash of the document and/or the link to the encrypted version of the document using smart contract functions. The document may be encrypted using a key corresponding to the document owner. Publishing the document data onto the blockchain may preserve the trustworthiness of the document and the legitimacy of the document's content. For example, the immutable nature of a blockchain may protect against unauthorized document modifications or tampering. Further, the cryptographic hash may preserve privacy and may prevent other users of the blockchain from viewing confidential information.

In some aspects, the document token may indicate that a recipient should acknowledge or sign a document. After accessing the link, document linking system 110 may identify an encrypted version of the document. The document linking system 110 may then decrypt the encrypted document using a digital signature key corresponding to the recipient. The recipient may provide a digital signature to confirm the acceptance. This digital signature may also be keyed to the recipient to provide verification and additional trustworthiness that the signature is legitimate and protected against interference or tampering. In some aspects, the digital signature may also be reflected in the human-readable portion of the document.

In some aspects, the digital signature may be a modification to the document. Document linking system 110 may manage this modification in a manner similar to generating a document so that the modified document may be preserved using database 120. For example, the signed document may be encrypted and stored as a modified version of the document. Document linking system 110 may generate a corresponding link to this encrypted version of the signed document and/or generate a cryptographic hash of the signed document. Document linking system 110 may create a document token corresponding to the signed document. Document linking system 110 may publish the hash and/or the link to the encrypted version of the signed document to a blockchain. Similarly, the encryption may have been performed using a key corresponding to the signing party to preserve confidentiality. In this manner, document linking system 110 may facilitate the acknowledgement or signing of a document or a contract using a document management process using a blockchain. In some aspects, document linking system 110 may store and/or manage modifications using database 120.

Similar to the acknowledgment or signing of a document, document linking system 110 may manage document editing and/or modification. For example, user devices 140B and 140C may participate in editing the document. Document linking system 110 may use a tokenization process to manage different versions of the document corresponding to the different modifications.

Document linking system 110 may manage this modification in a manner similar to generating a document so that the modified document may be preserved using database 120 and/or a blockchain. The modified document may be encrypted and stored as a modified version of the document. Document linking system 110 may generate a corresponding link to this encrypted version of the modified document and/or generate a cryptographic hash of the modified document. In some aspects, document linking system 110 may update an association corresponding to the document link to access the modified document. For example, a downstream user using the document link may be directed to the modified version of the document. The document flow data structure may also be updated to track the modification. The document owner may view this modification and/or accept or reject the modification. In some aspects, downstream users may also be able to view the document flow data structure to track the changes. In some aspects, document linking system 110 may create a separate document token and/or document link corresponding to the modified document. Document linking system 110 may publish the hash and/or the link to the encrypted version of the modified document to a blockchain.

Figure 1B:
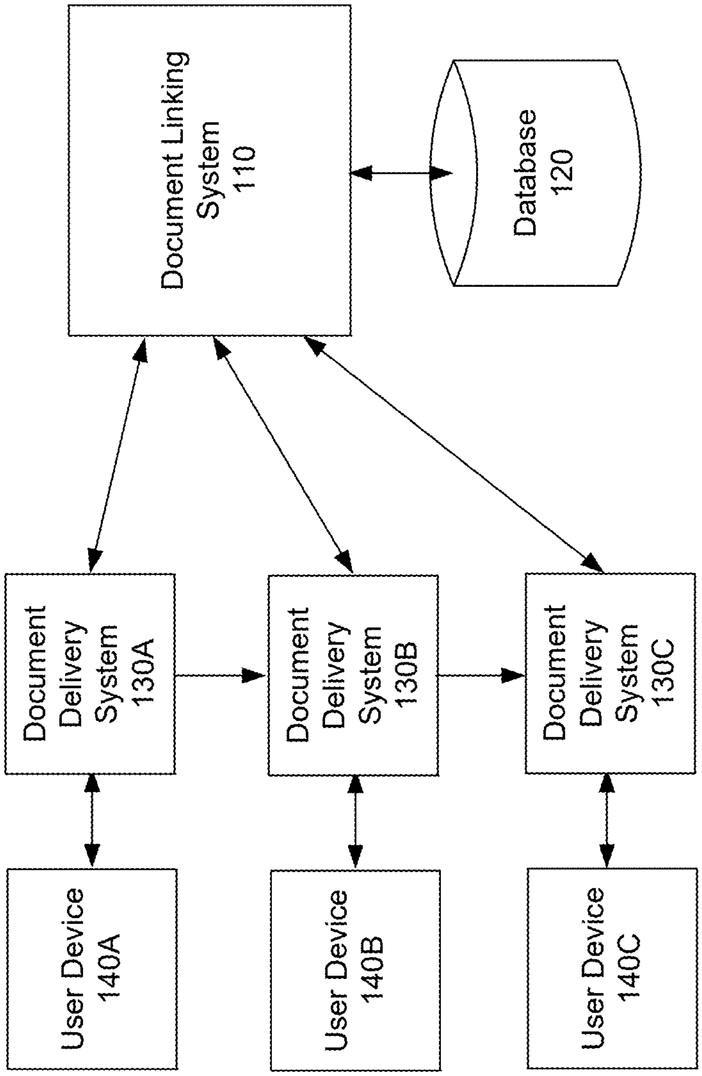
FIG. 1B is a block diagram illustrating a document management environment 100B with downstream dissemination, according to aspects of the present disclosure.

FIG. 1B is a block diagram illustrating a document management environment 100B with downstream dissemination, according to aspects of the present disclosure. Similar to FIG. 1A, document management environment 100B may include document linking system 110, database 120, document delivery systems 130, and/or user devices 140. Document management environment 100B depicts an example embodiment of a data communication path corresponding to downstream dissemination.

In this case, user device 140A may seek to disseminate a document that may not be editable. User device 140A may use document delivery system 130A to deliver the document to user device 140B via document delivery system 130B. User device 140A may select a plugin or widget corresponding to document linking system 110 to generate a document token and/or document link corresponding to the document. User device 140A may designate the document as being public. Document linking system 110 may transmit the document link to document delivery system 130A. Document delivery system 130A may then embed the document link in the message being drafted by user device 140A. User device 140A may then send the message to user device 140B via document delivery systems 130A, 130B.

User device 140B may then access the document link in the manner described above. Document linking system 110 may log and/or track this access. Document linking system 110 may provide the document for viewing and/or downloading based on the permissions set by user device 140A.

In some aspects, user device 140B may forward the message to user device 140C via document delivery systems 130B, 130C. For example, user device 140B may forward the original message, may copy and paste the document link into a new message, and/or may switch between email and/or social media post to further disseminate the document link. User device 140C may receive the document link via document delivery system 130C. User device 140C may then access and/or download the document via the document link. Document linking system 110 may track credentials and/or access information corresponding to user device 140C. User device 140A may view this access information and/or modify permissions corresponding to user devices 140B and/or 140C. This permission control is further described with reference to FIG. 1D.

Figure 1C:
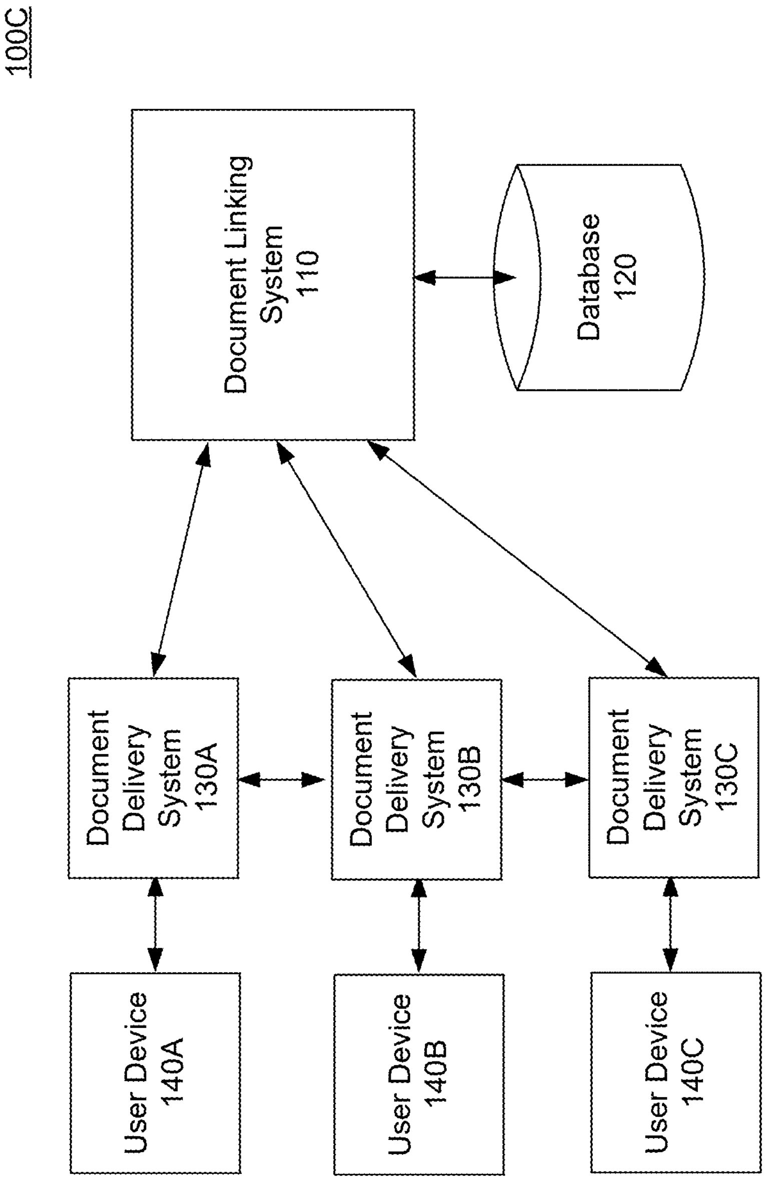
FIG. 1C is a block diagram illustrating a document management environment 100C with document collaboration, according to aspects of the present disclosure.

FIG. 1C is a block diagram illustrating a document management environment 100C with document collaboration, according to aspects of the present disclosure. Similar to FIG. 1A, document management environment 100C may include document linking system 110, database 120, document delivery systems 130, and/or user devices 140. Document management environment 100C depicts an example embodiment of a data communication path corresponding to downstream dissemination with collaboration.

In this case, user device 140A may seek to disseminate a document that may be editable. User device 140A may use document delivery system 130A to deliver the document to user device 140B via document delivery system 130B. User device 140A may select a plugin or widget corresponding to document linking system 110 to generate a document token and/or document link corresponding to the document. User device 140A may designate the document as being editable. Document linking system 110 may transmit the document link to document delivery system 130A. Document delivery system 130A may then embed the document link in the message being drafted by user device 140A. User device 140A may then send the message to user device 140B via document delivery systems 130A, 130B.

User device 140B may then access the document link in the manner described above. Document linking system 110 may log and/or track this access. Document linking system 110 may provide the document for viewing, downloading, and/or editing based on the permissions set by user device 140A.

In some aspects, user device 140B may edit the document using document linking system 110. For example, document linking system 110 may generate a GUI with the document. User device 140B may edit and/or modify this document in this GUI. In some aspects, an acknowledgment or a signature may be a modification. In some aspects, user device 140B may modify other content in the document. After preserving this editing, document linking system 110 may generate a second document token corresponding to the modified document. This second document token may distinguish the modified document from the original document generated by user device 140A. In some aspects, this second document token may represent a second version of the document. Upon generating the second document token, document linking system 110 may associate the second document token with the document link such that accessing the document link provides access to the second document token. In this manner, the document link may provide access to the modified document.

User device 140B may also modify the document by downloading the document, modifying the document locally, and uploading a modified version of the document. In this case, document linking system 110 may generate a second document token as described above and update the document link accordingly. Document linking system 110 may track the modification and upload of a new version.

As previously described, document linking system 110 may track edits, modifications, acknowledgments, and/or signatures using a document flow data structure. This document flow data structure may track one or more document tokens and corresponding versions. The modifications may be tracked with time stamps and/or identifying user information to identify users providing modifications. In this manner, a document owner may view modifications to the document as the document link is disseminated. The document owner may manage these modifications. For example, the document owner may accept or reject the modifications and/or associate different versions of the document with the document link. Actions taken by the document owner may be tracked in the document flow data structure. In some aspects, downstream users may be able to view the document flow data structure. This may depend on whether the document owner has chosen to provide this access to downstream users. Using the document flow data structure, document linking system 110 may track modifications and/or track access as the document is modified.

In some aspects, user device 140B may provide the document link to user device 140C. For example, user device 140B may be collaborating with user device 140C to modify the document. User devices 140B, 140C may perform one or more iterations of the document to modify the document. Despite the modifications, user devices 140B, 140C may use the same document link. Document linking system 110 may track the modifications as well as user credentials corresponding to the modifications. In some aspects, document linking system 110 may store modified versions of the document on database 120.

User device 140A corresponding to the document owner may view the document flow data structure to monitor the modifications. In some aspects, user device 140A may accept or reject modifications entered by user devices 140B, 140C. As will be further described with reference to FIG. 1D, user device 140A may also restrict access to the document to one or more downstream users. In this case, document linking system 110 may update the document flow data structure with this restriction.

Figure 1D:
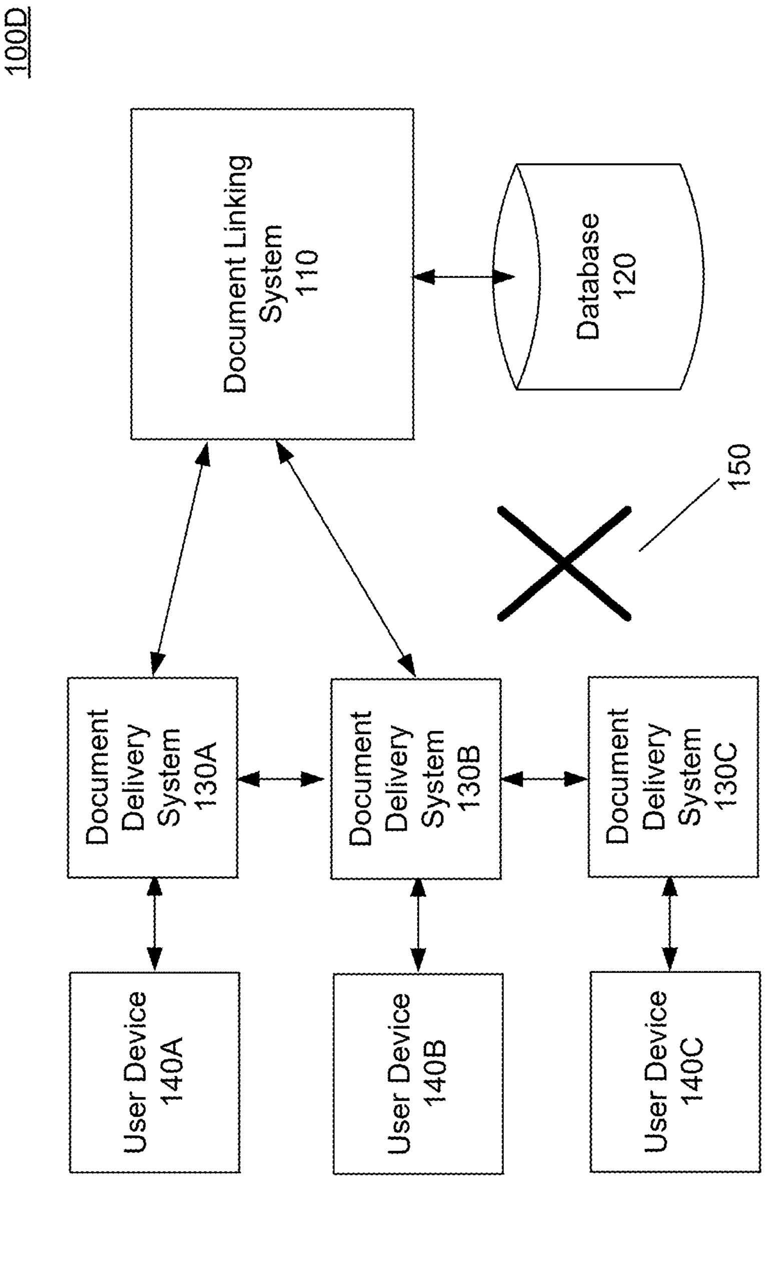
FIG. 1D is a block diagram illustrating a document management environment 100D with permission control, according to aspects of the present disclosure.

FIG. 1D is a block diagram illustrating a document management environment 100D with permission control, according to aspects of the present disclosure. Similar to FIG. 1A, document management environment 100D may include document linking system 110, database 120, document delivery systems 130, and/or user devices 140. Document management environment 100D depicts an example embodiment of a data communication path corresponding to downstream dissemination with a restriction 150.

In this case, user device 140A may seek to disseminate a document that may or may not be editable. User device 140A may use document delivery system 130A to deliver the document to user device 140B via document delivery system 130B. User device 140A may select a plugin or widget corresponding to document linking system 110 to generate a document token and/or document link corresponding to the document. Document linking system 110 may transmit the document link to document delivery system 130A. Document delivery system 130A may then embed the document link in the message being drafted by user device 140A. User device 140A may then send the message to user device 140B via document delivery systems 130A, 130B.

User device 140B may then access the document link in the manner described above. Document linking system 110 may log and/or track this access. Document linking system 110 may provide the document for viewing, downloading, and/or editing based on the permissions set by user device 140A.

User device 140B may forward the message to user device 140C via document delivery systems 130B, 130C. For example, user device 140B may forward the original message, may copy and paste the document link into a new message, and/or may switch between email and/or social media post to further disseminate the document link. User device 140C may receive the document link via document delivery system 130C. User device 140C may then access and/or download the document via the document link. Document linking system 110 may track credentials and/or access information corresponding to user device 140C.

User device 140A may view this access information and/or modify permissions corresponding to user devices 140B and/or 140C. For example, user device 140A may determine that the user corresponding to user device 140C should no longer be able to view and/or download the document. User device 140A may send a command to document linking system 110 to alter this access. Document linking system 110 may associate this permission with the credentials provided by user device 140C. Document linking system 110 may generate a restriction 150 based on these credentials. For example, the credentials may correspond to the single sign on credentials provided by document delivery system 130C. In this manner, restriction 150 may be conditioned on the credentials corresponding to document delivery system 130C. While restriction 150 is depicted with respect to user device 140C, user device 140A may restrict permissions corresponding to user device 140B.

In some aspects, restriction 150 may be applied to a document and/or to individual users attempting to access the document. For example, a document owner may apply restriction 150 to each user attempting to access the document via the document link. This may occur to restrict access to the document from each user. In some aspects, the document owner may restrict access after determining that a particular user has accessed the document. For example, after viewing the document flow data structure, the document owner may determine that a particular user who has accessed the document should not have access. This may be noted based on the logging performed by the document flow data structure. After determining that a particular user should not have access, document linking system 110 may apply restriction 150 to that user. This may be applied to the credentials used by the user to access document linking system 110 and/or a corresponding document delivery system 130.

Restriction 150 may be applied to different permissions. For example, rather than preventing viewing of the document, a document owner may change download permissions and/or editing permissions for a particular user. This control may provide additional flexibility for controlling access as a document is disseminated.

Based on the restrictions 150 applied by document linking system 110, document linking system 110 may provide downstream control related to access of a document. This control may occur even a document link is disseminated beyond an initial one or more recipients. A document owner may tailor restrictions and/or permissions to additional individuals accessing the document as the document is disseminated. In some aspects, the document link may specify a default permission, such as public, semi-public, or confidential as previously explained. Document linking system 110 may then adjust different permissions for different users even after the document link has been disseminated.

Other functions and/or operations of document linking system 110 will now be further described with reference to the other figures of this disclosure.

Figure 2:
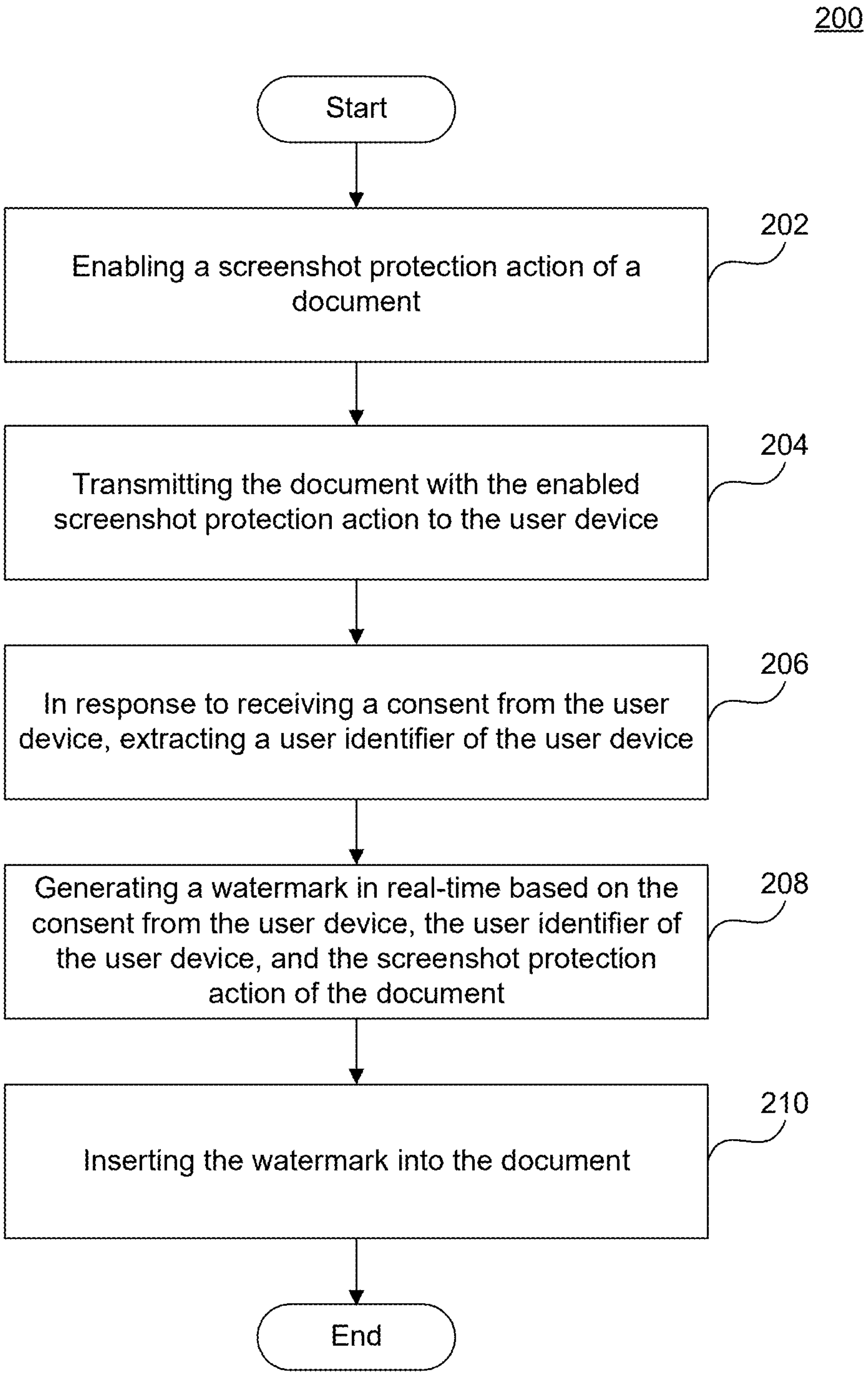
FIG. 2 is a flowchart illustrating a method 200 for generating a document watermarking, according to aspects of the present disclosure.

FIG. 2 is a flowchart illustrating a method 200 for generating a document watermarking, according to aspects of the present disclosure. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIGS. 1A-1D. However, method 200 is not limited to that example aspect.

In 202, when a user device 140A sends a document (e.g., or a document link) to a user device 140B, instead of directly sending the document between the user devices, user device 140A may transmit the document to a document linking system 110 via a document delivery system 130A. A screenshot protection action may be enabled by document linking system 110 to the document. Once the screenshot protection action may have been enabled to the document, document linking system 110 may transmit the document back to user device 140B. In some aspects, the screenshot protection action of a document may include, but is not limited to, watermarking a document and/or blocking a screen capturing of the document that can prevent a user device 140B from at least taking a screenshot of the document or sharing of sensitive information of the document.

Watermarking a document is a process of embedding a visible or invisible identifier, such as a logo or code, into digital content (e.g., images, videos, documents, etc.) to indicate ownership, authenticity, or copyright of the digital content. The visible identifier or watermarks, which are visually noticeable, may include a logo or text overlaid on an image or video. The invisible watermarks may be embedded into the content in a way that are imperceptible to a naked eye but can be detected by software, tools, or specialized algorithms. For example, embedding invisible watermarks to a document can be achieved through steganographic methods, which involve making small, imperceptible changes to the content's pixels or other data elements (e.g., subtle pattern or objects across the image).

In some aspects, embedding watermarks into a document can facilitate identifying the source of leaked or unauthorized content by tracking an identifier that may include ownership, authenticity, or copyright of the document. Embedding watermarks of a behavior into a document may mean to visually embed a reminder or instruction related to behavior, such as adding a "CONFIDENTIAL" or "INTERNAL USE ONLY" watermark to a document to indicate its confidentiality and sensitivity. In some aspects, watermarking a document may potentially deter unauthorized use or copying of the digital content in which the presence of a visible watermark can discourage unauthorized copying or distribution of the digital content. In some other aspects, embedding visible watermarks, for example, a platform logo or a username, can serve as a branding tool to boost visibility of a platform or an influencer at social media.

Blocking a screen capturing of a document is a process that can prevent anyone from taking a screenshot when accessing the document from a local user device or via a remote session. In some aspects, with the screenshot protection action enabled, document linking system 110 may automatically disable print-screen keystroking and block any third-party screen grabbing tools. The blocking of screen capturing can also be implemented at a cloud level in which the screen capture protection can be configured on session hosts using a Microsoft Intune device configuration policy or group policy. Additionally or alternatively, the document linking system 110 may listen for keystrokes signifying a screenshot. If the keystrokes are detected, some action may be taken. For example, the screenshot may be logged, the screenshot may be blocked, a warning message may be displayed, or any combination thereof.

In some aspects, document linking system 110 may enable other protection actions of the document, including but not limited to, blocking a sharing of the document and/or blocking a copying of the document. For example, to prevent a document from being shared further, the system may restrict sharing permissions, remove access for specific individuals or groups, or limit external sharing by domain. The system may sometimes combine different protection actions together. For example, the system may allow sharing of a document externally but block a downloading or copying of the document.

Figure 3A:
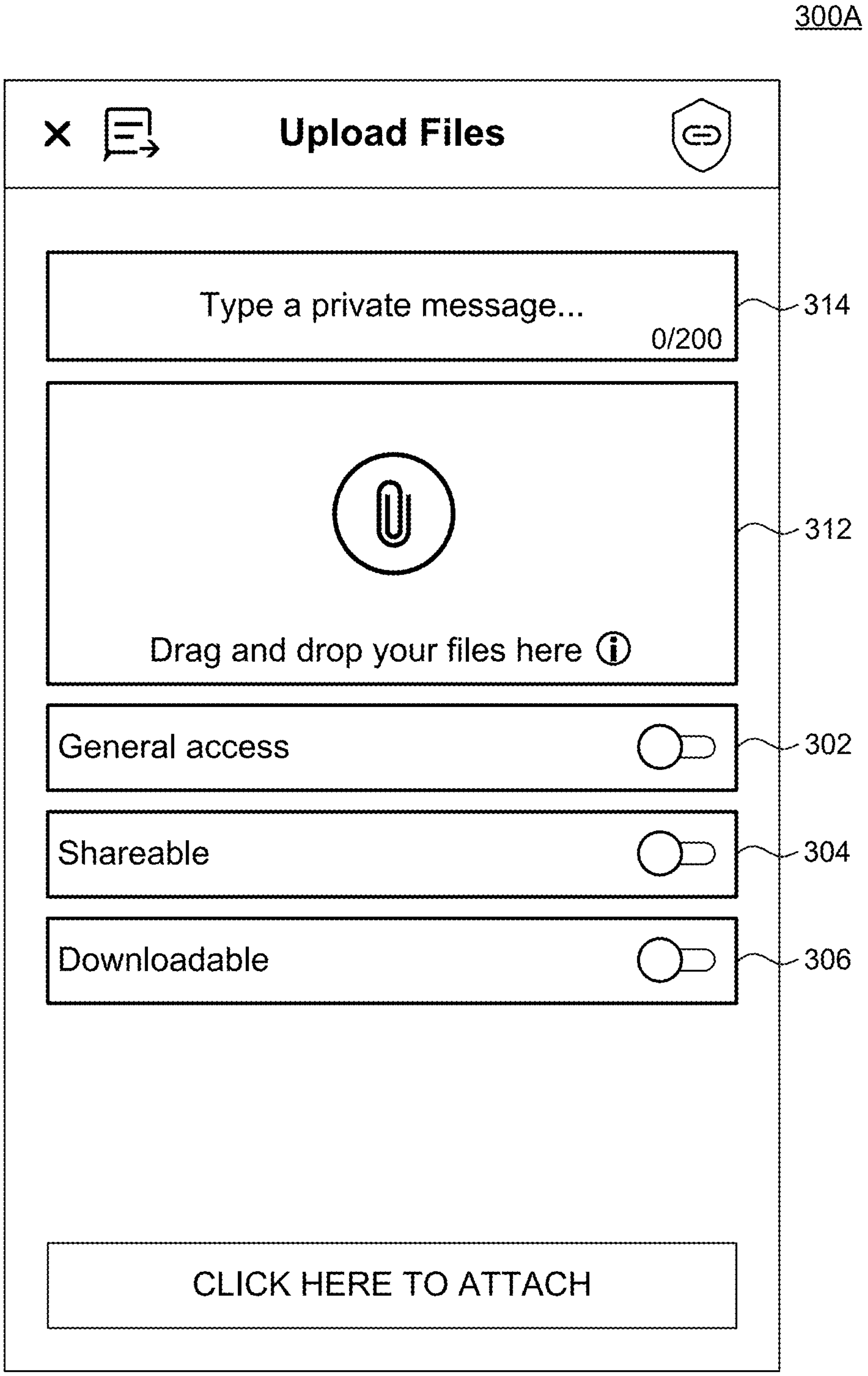
FIG. 3A is an example illustrating enabling a protection action 300A for a document, according to aspects of the present disclosure.

FIG. 3A is an example illustrating enabling a protection action 300A for a document, according to aspects of the present disclosure. FIG. 3A shall be described with reference to FIGS. 1A-1D and FIG. 2. However, FIG. 3A is not limited to that example aspect. As an illustration, the example of FIG. 3A shows at least three protection actions that can be enabled by document linking system 110 for the document, including but not limited to, enabling a general access 302 of the document, enabling a sharing 304 of the document, and/or enabling a downloading 306 of the document. General access 302 of the document can control an access of a person that can open the document. When the general access is not enabled as illustrated in FIG. 3A, only recipients with access can open or view the document. Shareable option 304 of the document can control whether a recipient or individual can share the document to others. When shareable option 304 is not enabled as illustrated in FIG. 3A, the document cannot be shared with others. Downloadable option 306 of the document can control whether a recipient or individual can download the document. In some aspects, when downloadable option 306 is not enabled as illustrated in FIG. 3A, the document cannot be downloaded by the recipient but the document may be viewed or shared to others if general access 302 and shareable option 304 are both enabled. In some aspects, the document can be provided to document linking system 110 by dragging or dropping the document into box 312. In some aspects, a private message (with limited words) can be provided to the system tying into box 314.

Figure 3B:
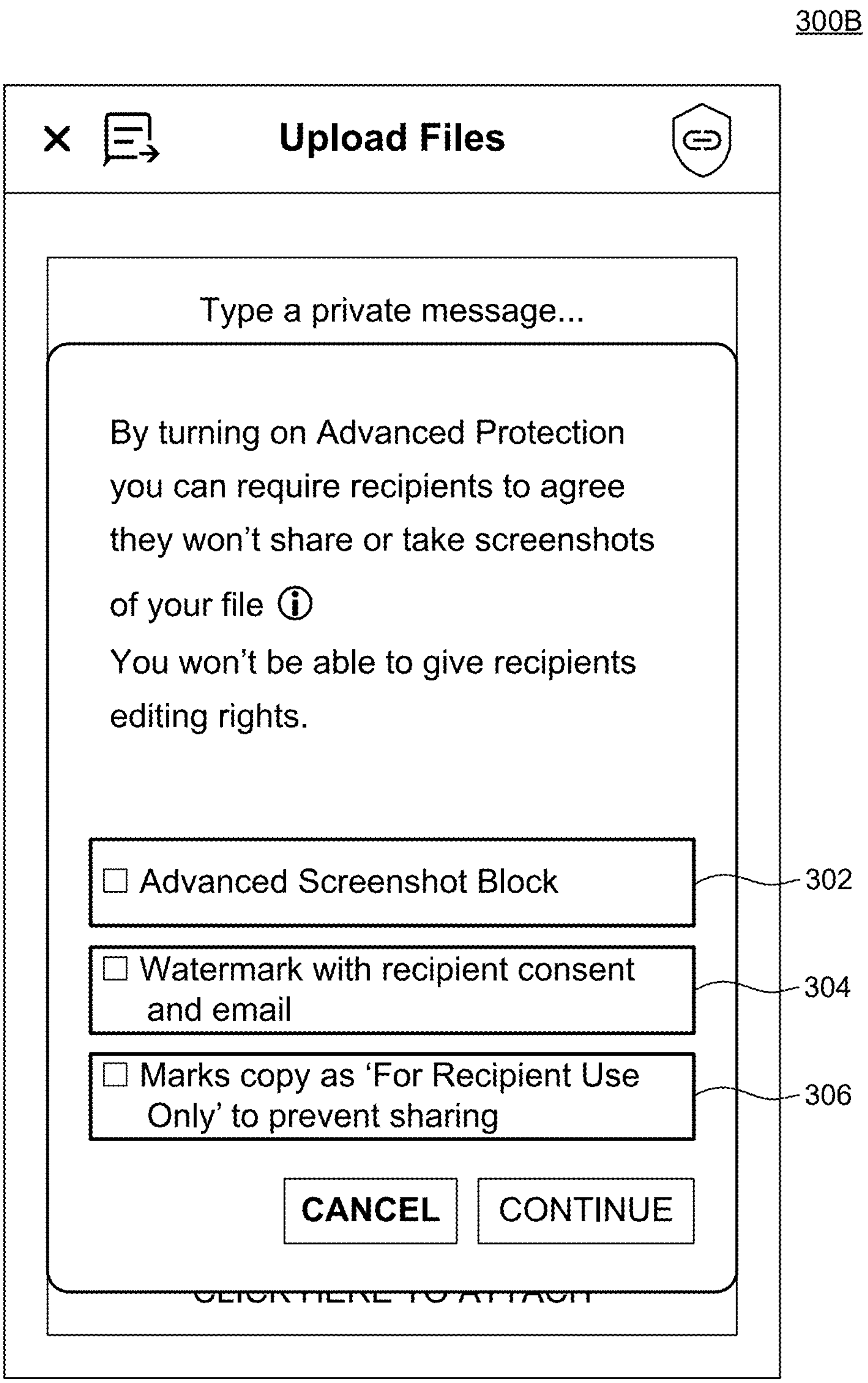
FIG. 3B is an example illustrating enabling an advanced protection action 300B for a document, according to aspects of the present disclosure.

FIG. 3B is an example illustrating enabling an advanced protection action 300B for a document, according to aspects of the present disclosure. FIG. 3B shall be described with reference to FIGS. 1A-1D and FIG. 2. However, FIG. 3B is not limited to that example aspect. As another illustration, the example of FIG. 3B shows at least three advanced protection actions that can be enabled for the document, including but not limited to, enabling an advanced screenshot blocking 352 of the document, enabling a watermarking of the document with recipient consent and email 354, and/or enabling a marking copy of the document as "For Recipient Use Only" 356 to prevent sharing of the document. In particular, when turning on the advanced protection actions, document linking system 110 can require recipients to agree that they won't share or take screenshots of the document, as will be further described below in FIG. 5. When advanced screenshot blocking 352 is not enabled as illustrated in FIG. 3B, recipients may use print-screen keystroking or any third-party screen grabbing tools to capture the screenshot. When watermarking of the document with recipient consent and email 354 is not enabled as illustrated in FIG. 3B, recipients may view the document without watermark. When marking copy of the document 356 is not enabled as illustrated in FIG. 3B, recipients may use share or copy the document without the textual marks, for example, "For Recipient Use Only" may not be added to the document in this case. In some aspects, different advanced protection actions illustrated in FIG. 3B may be combined with each other to prevent the document from being shared or having a screenshot taken. In some other aspects, advanced protection actions may also be combined with protection actions illustrated in FIG. 3A for any document protection purposes.

Referring back to FIG. 2, in 204, the document with the enabled screenshot protection action may be transmitted by document linking system 110 to user device 140B via document delivery system 130B. In some aspects, rather than providing the document to document linking system 110, a document link (e.g., document reference link or hyperlink, etc.) for the document may be generated by document linking system 110 that may direct user device 140B and/or user device 140A (both of the user devices can have the access using the link) to a designated location that references to the document. The document link may be associated with a selection of the screenshot protection action by user device 140A, and the document link with the selection of the screenshot protection action may then be transmitted to user device 140B.

In some aspects, user device 140B may also have a request to share any documents back to user device 140A. In this case, a screenshot protection action may then be enabled to the document as instructed by user device 140B. A document link for the document may be generated by document linking system 110 that may direct user device 140A and/or user device 140B to a designated location that references to the document. The document link may also allow a selection of the screenshot protection action by user device 140B, and the document link with the selection of the screenshot protection action may then be transmitted back to user device 140A.

Figure 4:
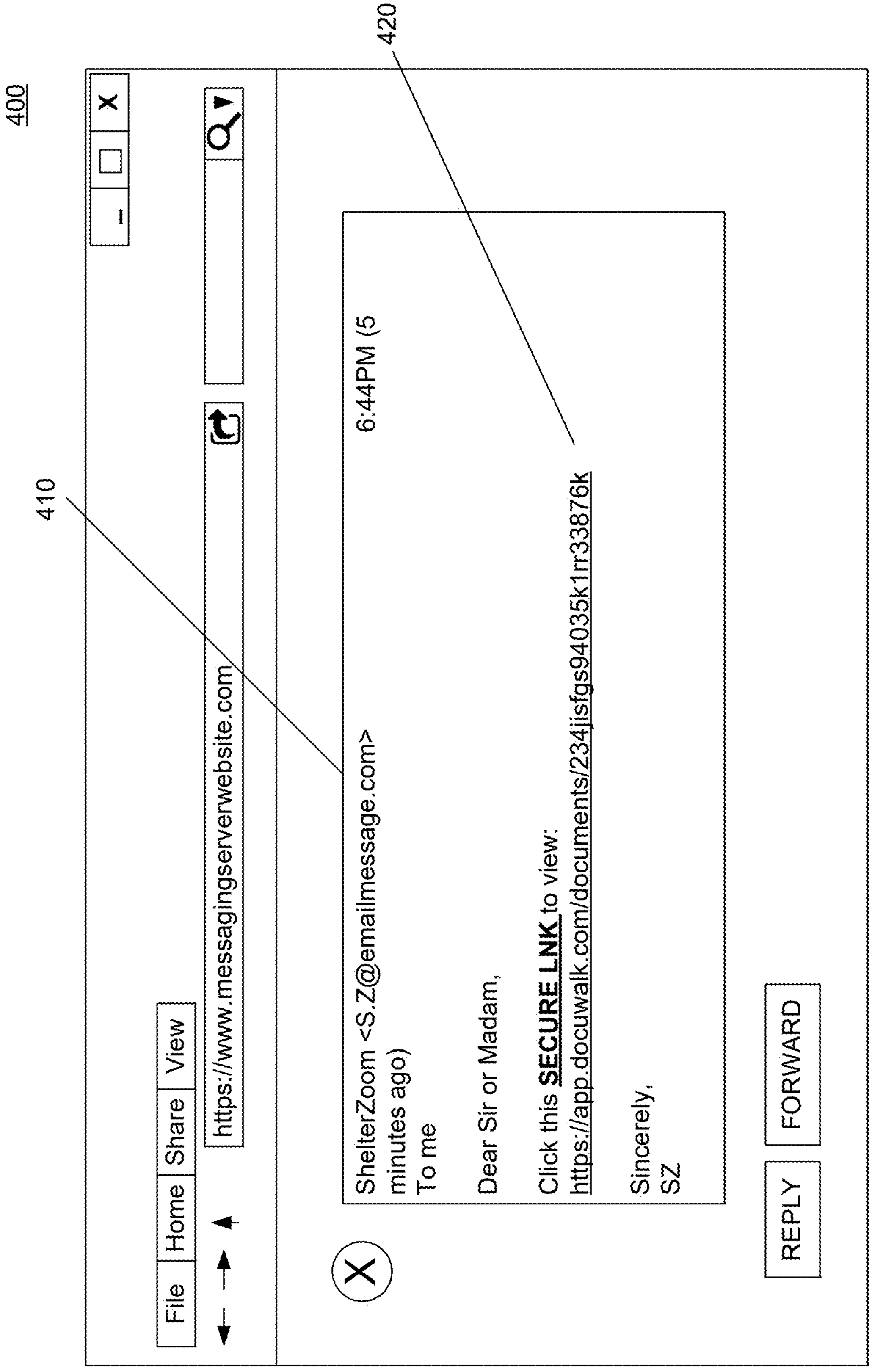
FIG. 4 is an example illustrating a graphical user interface (GUI) 400 that displays a message including a document link, according to aspects of the present disclosure.

FIG. 4 is an example illustrating a GUI 400 that displays a message 410 including a document link 420, according to aspects of the present disclosure. GUI 400 shall be described with reference to FIGS. 1A-1D and FIG. 2. However, GUI 400 is not limited to that example aspect. As an illustration, the example of FIG. 4 shows that a user device 140B may receive message 410, which may include document link 420. As previously explained, document link 420 may have been generated and inserted into the message 410 prior to sending the message to an intended recipient. The sender of message 410 (e.g., user device 140B) may include other information in the body of the message as well. Upon receiving message 410, the recipient (e.g., user device 140B) may select document link 420 to access document linking system 110 and/or the corresponding document. In some aspects, document link 420 may be used in a web browser and/or via the document delivery system 130 corresponding to the recipient.

Figure 5:
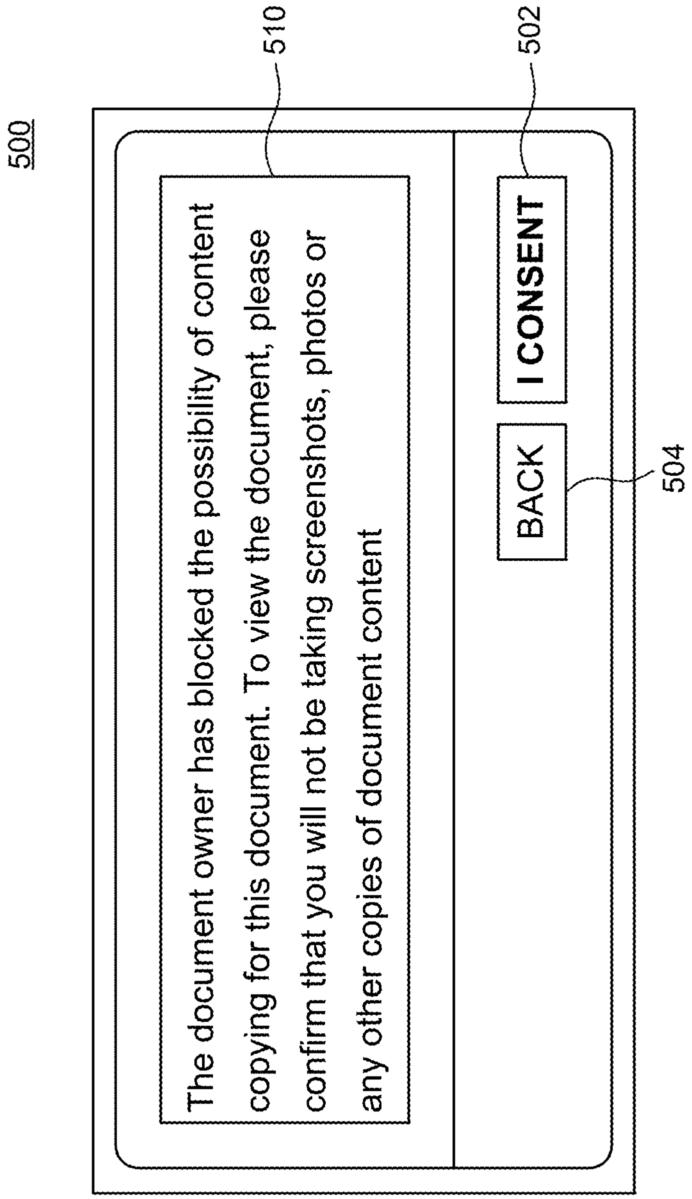
FIG. 5 is an example illustrating a GUI 500 that displays a message including a request for a user consent, according to aspects of the present disclosure.

FIG. 5 is an example illustrating a GUI 500 that displays a message 510 requesting a user consent 520, according to aspects of the present disclosure. GUI 500 shall be described with reference to FIGS. 1A-1D and FIG. 2. However, GUI 500 is not limited to that example aspect. As an illustration, the example of FIG. 5 shows that after user device 140B clicks document link 420 within message 410 via GUI 400 to access the document, document linking system 110 may transmit a message 510 with a request for a user consent from user device 140B to not share or take screenshots, photos or any other copies of the document, when the advanced protection actions and/or protection actions illustrated in FIGS. 3A-3B were enabled for the document. User device 140B may identify whether these protection actions were enabled from message 510 in GUI 500 such that the user device may decide whether they need to conform to the enabled protections if they want to view or access the document. In some aspects, message 510 may be transmitted by document linking system 110 to user device 140B in a real-time manner, but the transmission may also be delayed due to a networking capability or a communication bandwidth.

After receiving the requests sent by document linking system 110, user device 140B may press "I CONSENT" button 502 to indicate that they will conform to the screenshot protection or document sharing or copying policy when viewing or accessing the document. Otherwise, user device 140B may press "BACK" button 504 to indicate they will not conform to the screenshot protection or document sharing or copying policy. In some aspects, a consent management platform, which is part of the document linking system, may collect the user consent choices. User device 140 may then transmit the user consent to a tag, such as Google Tag which may in turn, send a parameter with the consent status to document linking system 110.

Referring back to FIG. 2, in 206, in response to receiving a consent from a user device 140B in which the consent may indicate the user device may conform to the screenshot protection action when viewing or accessing the document, a user identifier of user device 140B may be extracted by document linking system 110. In some aspects, the user identifier may be a unique piece of information used to identify and distinguish a user from others within a system, application, or online service. The user identifier can take various forms, including but not limited to, a unique user icon (e.g., or user device icon), an internet protocol address of the user (e.g., or user device), a name of the user, an email address of the user, and/or a device identifier of the user device. In some aspects, the user identifier may also include a unique code (or identifier) that is associated with the user or user device and can only be recognized by an organization (e.g., a sender device). For example, an intelligence agency, a pharmaceutical company, or a mergers and acquisitions firm could incorporate such unique code or system-generated identifier for each user or user device, which would be unrecognizable to humans (the users) or the user devices. This ensures that recipients of a file who intend to leak information remain unaware that they are being monitored. If a leak occurs, the organization or the sender device can trace it back to the source. This method is highly effective for detecting fraud and assessing employees or partners who might pose a security risk.

In 208, after extracting the user identifier of user device 140B, a watermark (e.g., either visible or invisible by user device 140B) may be generated by document linking system 110 in real-time based on the consent from the user device, the user identifier of the user device, and/or the screenshot protection action of the document.

In some aspects, the visible watermark may be intentionally made by document linking system 110 on the surface of the document (e.g., either a digital or physical watermark) as text, logos, or other graphics overlaid on the document's content. The visible watermark may often be used for copyright protection or branding. When generating this visible watermark, which will be further described below in FIG. 5, watermark parameters, including but not limited to, a location, a size, an orientation, or an aspect ratio of the text, logos, or other graphics associated with the watermark may be determined by document linking system 110. These watermark parameters may also be received or provided by the sender device, e.g., user device 140A.

In some aspects, the invisible watermark may be embedded into a hidden pattern or code that may manipulate an image pixel of the document being viewed or accessed by user device 140B. To create an invisible watermark, document linking system 110 may use specialized software or services to embed the hidden signal into the document or without altering its appearance. Different technologies, including but not limited to, steganography approaches, frequency domain approaches, and/or any other transforms (across different domains) such as cosine transform and wavelet transform, may be also used for generation of the invisible watermark.

When using steganography approaches, the watermark information may be hidden within other data by document linking system 110. For example, steganography approaches performed by the system may leverage least significant bit modification to modify the least significant bits of pixels in a document image or video (e.g., carrier data). The system using steganography approaches may embed the watermark into metadata of the document. The system may also use a mask to selectively modify certain parts of the document image or video (or other parts of the carrier data), and/or use specific encoding models or tools to encode the watermark into the carrier data. In some aspects, when using frequency domain approaches, the document image or video or other carrier other may be decomposed into different frequency bands by document linking system 110. Such frequency decomposition may be performed by different algorithms, including but not limited to, Fourier transform, short-time Fourier transform, wavelet transforms, and/or time-frequency analysis. The invisible watermark may be embedded into the least sensitive sub-bands by the system. Embedding the invisible watermark into the least sensitive sub-bands of the frequency bands may ensure that the embedding would not alter the visual appearance of the document.

In some aspects, the watermark may be generated by document linking system 110 in a real-time manner. The real-time watermarking may involve dynamically adding invisible or visible watermarks to content as it is being streamed or processed. This real-time watermarking may enable features like online content protection, piracy detection, and tracking unauthorized distribution, offering immediate benefits by minimizing security breaches. To watermark the document in a real-time manner, watermarks may be added or embedded into the document or content on-the-fly or in a dynamic manner. This particularly means that these watermarks may not be permanently etched into the document. Specifically, the parameters for generating the watermark to a type of document or a group of documents may be predefined and stored into a database. When user device 140B transmits the user consent message back to document linking system 110, the system may simultaneously retrieve those parameters and apply them (along with the user consent message) to generate the watermark. In some aspects, the user identifier associated with the user device (without dynamic user features) may also be predefined or stored in the database for any real-time retrieval or processing purposes. However, as for these dynamic user features in the user identifier, for example recipient's name and email, date and time the document was opened, and/or specific metadata associated with the document or user device, variables or placeholders within the watermark parameters may be used to automatically update the dynamic user features and then incorporate those features into the document based on the document's context. This dynamic watermarking may make sure each stream or user device can have a unique watermark, making it easier to identify the source of a leak or unauthorized copy.

Figure 6:
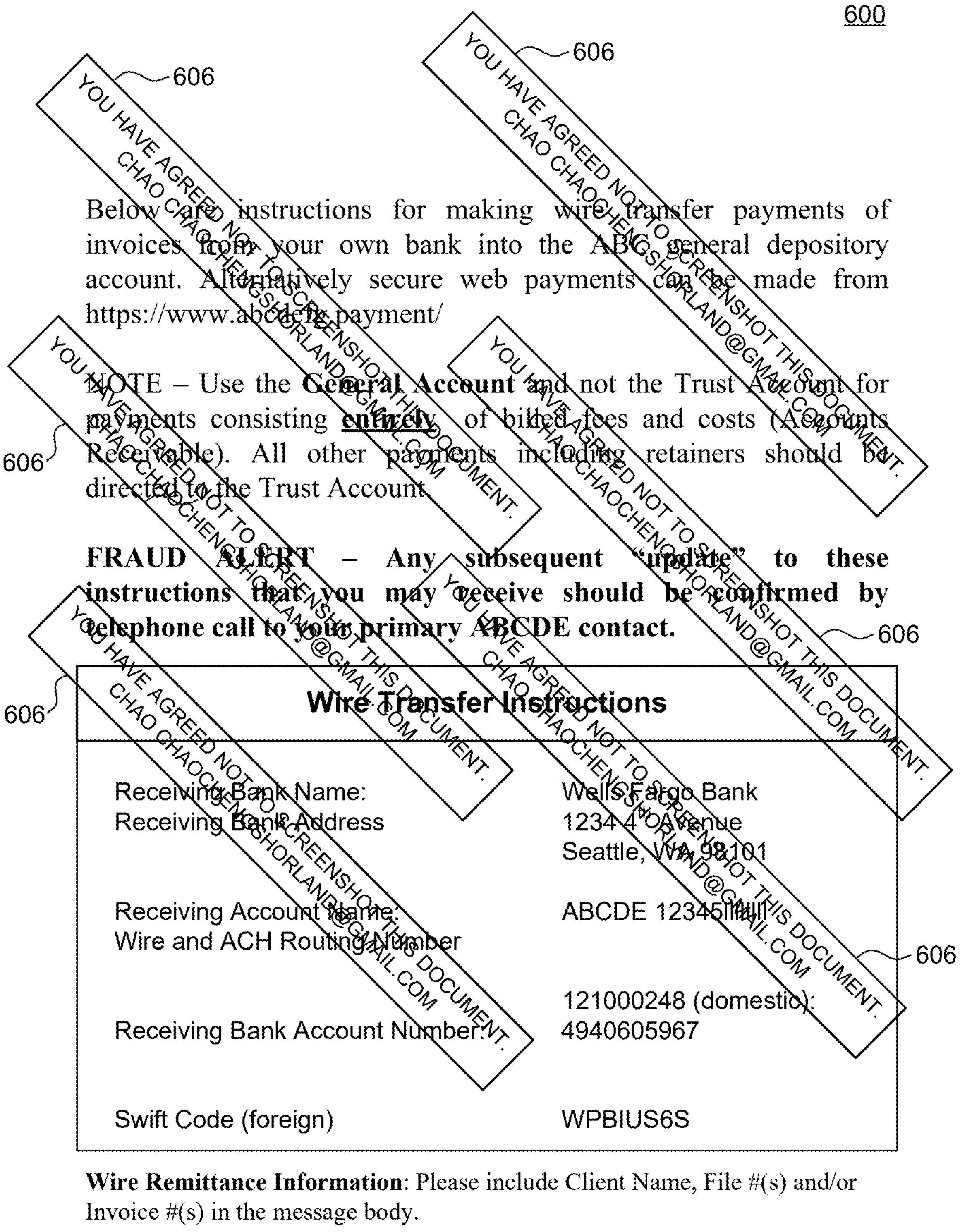
FIG. 6 is an example illustrating a watermarking 600 of a document, according to aspects of the present disclosure.

FIG. 6 is an example illustrating a watermarking 600 of a document, according to aspects of the present disclosure. Watermarking 600 shall be described with reference to FIGS. 1A-1D and FIG. 2. However, watermarking 600 is not limited to that example aspect. As an illustration, the example of FIG. 6 shows a visible watermark 606 with text "YOU HAVE AGREED NOT TO SCREENSHOT THIS DOCUMENT" overlaid on the document's content. Visible watermark 606 may also include, but is not limited, a user identifier of user device 140B, such as an email address of the user or any device identifiers associated with the user device. In some aspects, visible watermark 606 may generated with any sizes, orientations, aspect ratios, and/or other parameters. These parameters may be determined, based on the layout or content of the document, by document linking system 110 to optimize a visualization of the document and/or the watermark. These parameters may also be provided by user device 140A (e.g., sender device) for any visualization purposes.

Referring back to FIG. 2, in 210, the watermark generated in 208 may be inserted into the document by document linking system 110. When the watermark is visible, it may be inserted to any pixel coordinates (e.g., locations) of the document image or video. When the watermark is invisible, it may be inserted or embedded into the image pixel of the document. In some aspects, document linking system 110 may modify the pixel values, in either a color or a grayscale channel, to insert or embed the generated watermark information.

In some aspects, an event or any actions of a user device 140B associated with the document may be detected or tracked by document linking system 110. An event tracker of the system may be used to monitor and record specific actions or events related to that document, including but not limited to, when the document or any different versions of the document are opened, accessed, edited, and/or shared. In some aspects, the event tracker may be implemented by a document management system, a collaborative platform, an analytics tool, and/or custom scripts and APIs. For example, many document management systems may offer built-in features for event tracking, allowing user devices to monitor document activities. Collaborative platforms like Microsoft Teams or Google Workspace may provide tracking capabilities for documents shared within the platform. Analytics tools like Google Analytics can be used to track interactions with documents hosted on websites. Developers can also implement custom event tracking using scripts and APIs to monitor document activity.

Figure 7A:
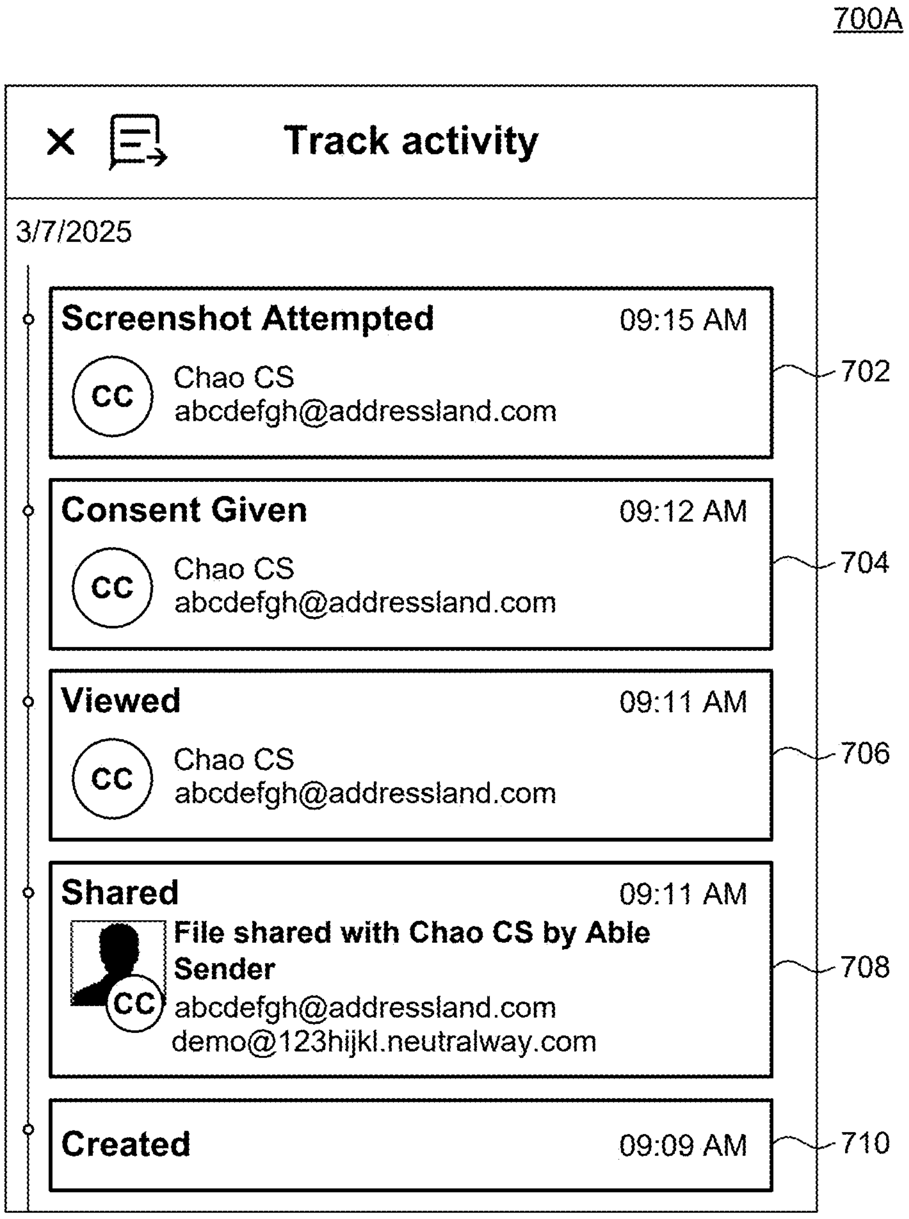
FIG. 7A is an example illustrating an activity tracker 700A of a document, according to aspects of the present disclosure.

FIG. 7A is an example illustrating an activity tracker 700A of a document, according to aspects of the present disclosure. Activity tracker 700A shall be described with reference to FIGS. 1A-1D and FIG. 2. However, activity tracker 700A is not limited to that example aspect. As an illustration, the example of FIG. 7A shows a history of the tracked activities (or events) associated with the document. For example, the tracked activities may include, but are not limited, a screenshot being attempted 702, a consent being given 704, the document being viewed 706, the document being shared 708, and/or the document being created 710. These tracked activities may also include any user identifier or metadata related to the document, for example, the email addresses of the sender and/or the recipient and the times or dates that each activity has been tracked.

Figure 7B:
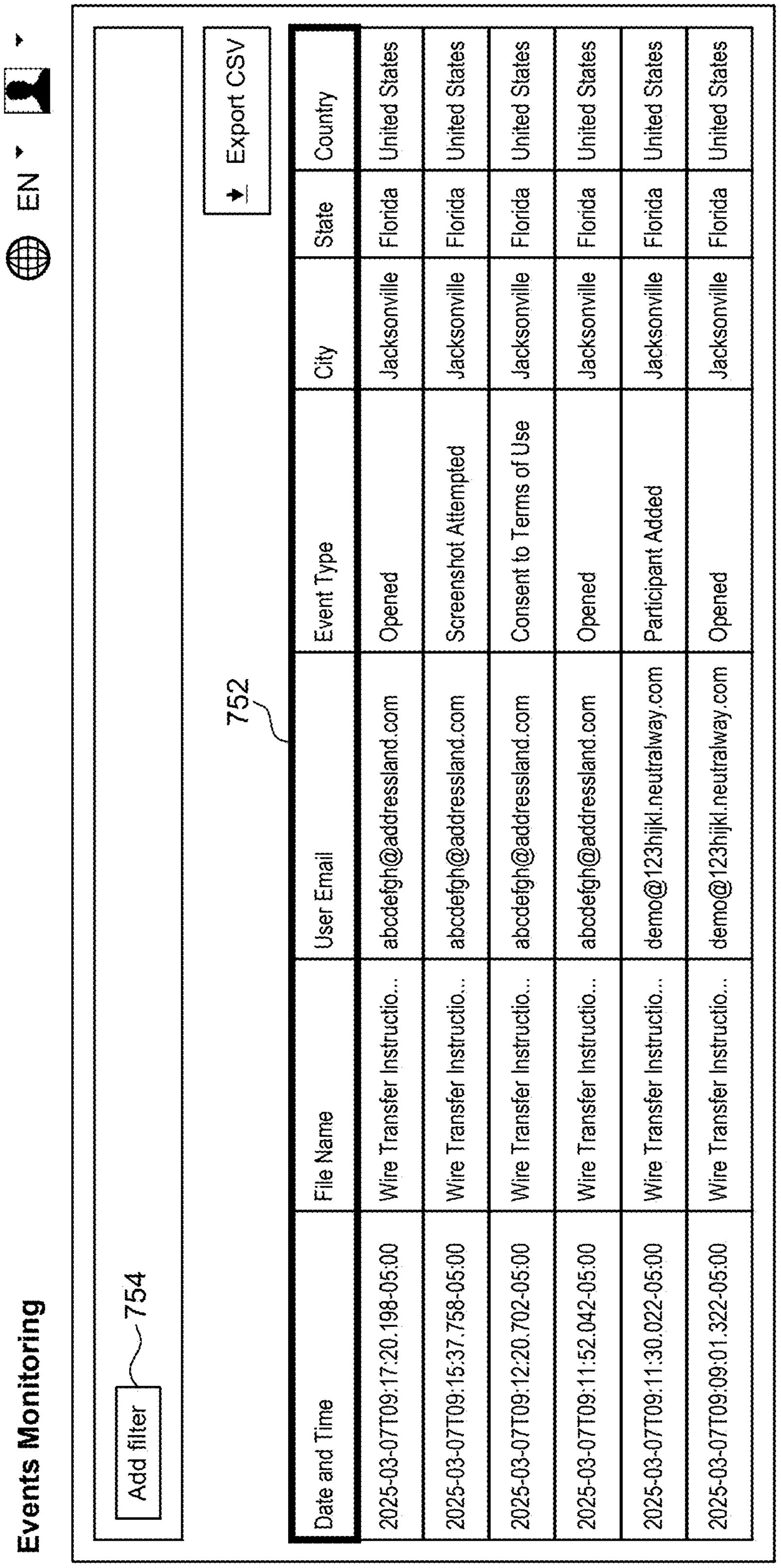
FIG. 7B is an example illustrating an activity tracker 700B of a document, according to aspects of the present disclosure.

FIG. 7B is an example illustrating an activity tracker 700B of a document, according to aspects of the present disclosure. Activity tracker 700B shall be described with reference to FIGS. 1A-1D and FIG. 2. However, activity tracker 700B is not limited to that example aspect. As an illustration, the example of FIG. 7B shows an event monitoring dashboard (e.g., a type of activity tracker) associated with one or more documents. The dashboard can support categorization of the events based on event parameters 752. The event parameters may include, but are not limited to, a document or file identifier (file name), a type of the event, the user device (with user identifier) that triggers the event, and/or a time or a geographical location (city, state, or country) associated with the user device that triggers the event. In some aspects, activity tracker 700B may support a filtering 754 of the documents based on the event parameters.

In some aspects, the event of user device 140A and/or user device 140B may be stored into a database 120 by document linking system 110. A link to the database address may then be generated by the system to access the stored event of the user device. In some aspects, the database may be a blockchain and the document linking system may manage documents using document tokens via a blockchain. The document tokens may correspond to generated documents and/or modifications (e.g., watermarking) of documents. The document tokens may be used with the blockchain to provide proof of a document creation or modification. For example, on either a public or private blockchain, new documents and/or modifications may be tracked as updated blocks and/or code executed on a blockchain using smart contract functions. The publication to a blockchain may provide security and trust that modifications are immutable. Distributed ledger technology may further be used to provide a streamlined manner of tracking documents and/or modifications and presenting these documents to parties communicating and/or editing a document.

In some aspects, a unique token may be generated for the document by document linking system 110 based on the enabled screenshot protection action of the document. The document linking system 110 may need to use a secure tokenization process to generate the token (e.g., a non-fungible token) for the document. Within the secure tokenization process, the system may assign a unique identifier to each document in which the identifier may include the file name of the document or a unique piece of information used to identify and distinguish a user device from others within a system, application, or online service. The unique identifier may act as the core element for generating a token since there is only one token for this document and the token may be used to represent ownership and/or permissions corresponding to a document.

In some aspects, the token may be generated as a random unique string of characters, including letters, numbers, and/or special symbols. The token may also be generated by hashing the unique identifier (or other relevant information) of the document using a cryptographic hash function including, but not limited to, SHA-256. SHA-256 hash function produces a 256-bit (32-byte) hash value from the unique identifier, widely used for verifying data integrity, secure password storage, and digital signatures, including in blockchain technology. Document linking system 110 may incorporate a timestamp, as part of the hash, into the token in which the token may expire after a certain period of time. In some aspects, for added security, the generated token may be further encrypted using a secret key known only to the system.

After the token is generated for the document, any sensitive information of the document may be replaced by document linking system 110 with the token that references the sensitive information of the document in a location within a database. In some aspects, those generated tokens can be used by document linking system 110 to create temporary or limited-access links for sharing documents with any internal and/or external user devices. In some aspects, when a user device needs to access the document, the user device may provide the token. Document linking system 110 may then verify the token against the stored document information to grant access. For example, the system may validate your tokens using application identifier. The system may also validate the token by at least parsing the token, verifying the token signature, and/or validating the claims that are stored in the token.

Figure 8:
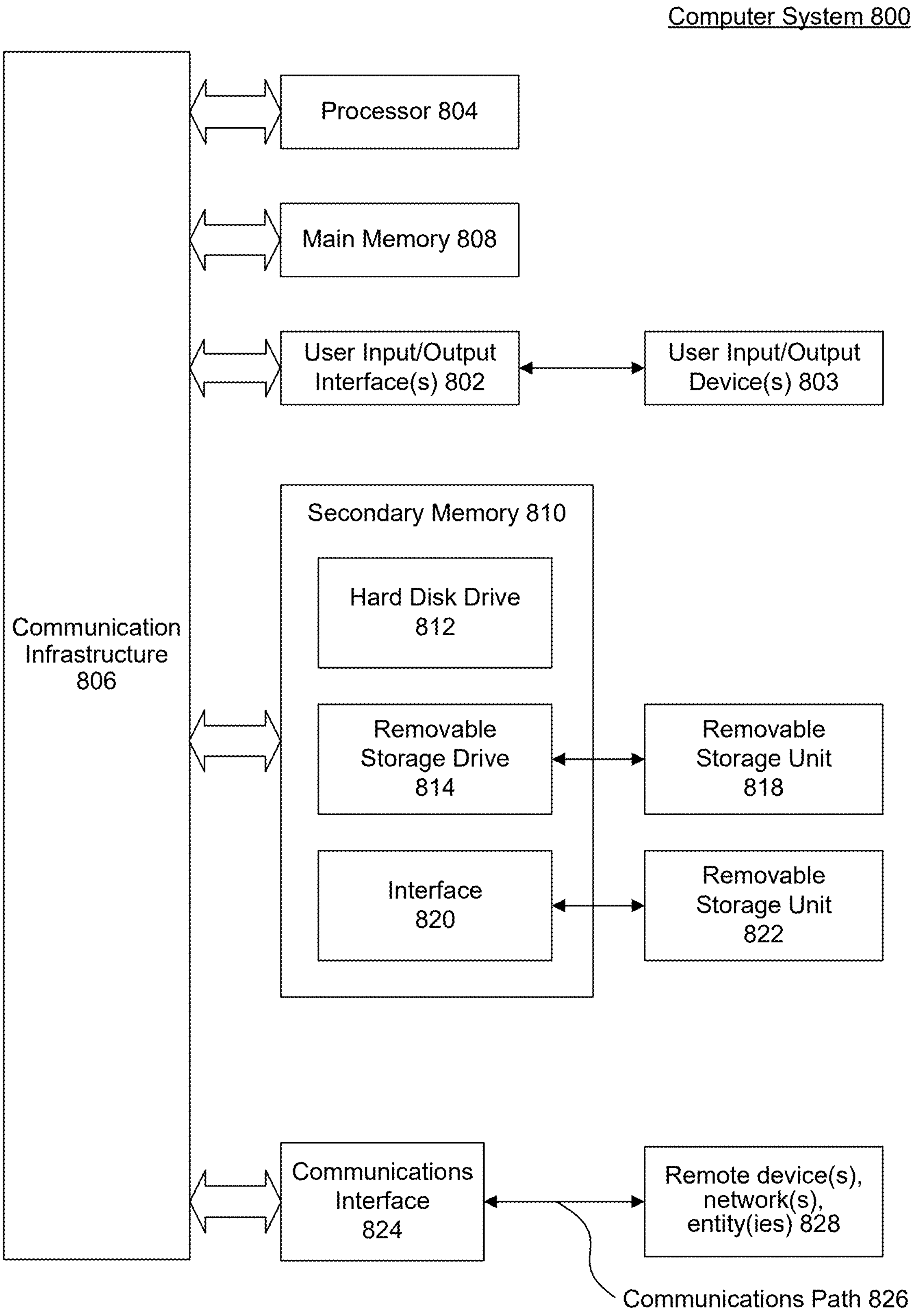
FIG. 8 illustrates an example computer system useful for implementing various aspects of the present disclosure.

Various aspects may be implemented, for example, using one or more well-known computer systems, such as computer system 800 shown in FIG. 8. For example, aspects herein using the text summarization system may be implemented using combinations or sub-combinations of computer system 800. Also or alternatively, one or more computer systems 800 may be used, for example, to implement any of the aspects discussed herein, as well as combinations and sub-combinations thereof. A “module,” as the term is used herein, is a computational element that performs one or more functions according to computer readable instructions stored on one or more memories or other non-transitory computer-readable media.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an aspect, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software (“on-premise” cloud-based solutions); “as a service” models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800 or processor(s) 804), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 8. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A computer-implemented method, comprising:

enabling, by one or more processors, a screenshot protection action of a document, the screenshot protection action preventing a user device from at least taking a screenshot or sharing of sensitive information of the document;

transmitting the document with the screenshot protection action to the user device;

in response to receiving a consent from the user device, extracting a user identifier of the user device, the consent indicating that the user device will conform to the screenshot protection action when viewing or accessing the document;

generating a watermark in real-time based on the consent from the user device, the user identifier of the user device, and the screenshot protection action of the document; and inserting the watermark into the document.

2. The computer-implemented method of claim 1, wherein the screenshot protection action further comprises:

watermarking the document; and blocking a screen capturing of the document.

3. The computer-implemented method of claim 1, further comprising:

blocking a sharing of the document; and blocking a copying of the document.

4. The computer-implemented method of claim 1, wherein the user identifier further comprises a unique user icon, an internet protocol address of the user device, a name of a user of the user device, an email address of the user, a device identifier of the user device, or a unique code associated with the user device.

5. The computer-implemented method of claim 4, wherein the unique code is recognizable by a sender device of the document but not unrecognizable by the user device.

6. The computer-implemented method of claim 1, further comprising:

detecting an event of the user device associated with the document;

storing the event of the user device into a database; and monitoring, in a user interface, the event of the user device in the database, wherein the user interface supports filtering of the event based on at least a type of the event, the user device that triggers the event, or a time or a geographical location associated with the user device that triggers the event.

7. The computer-implemented method of claim 6, wherein the event of the user device comprises a print-screen keystroking of the document.

8. The computer-implemented method of claim 1, wherein the transmitting the document further comprises:
generating a link for the document, the link being associated with the screenshot protection action of the document; and
transmitting the link with the screenshot protection action to the user device.

9. The computer-implemented method of claim 1, further comprising:
transmitting a link to the user device for sharing another document, wherein the link supports the user device to select another screenshot protection action for the other document.

10. The computer-implemented method of claim 1, further comprising:
generating a unique token for the document based on the screenshot protection action of the document; and
replacing the sensitive information of the document with the unique token that references the sensitive information of the document in a location within a database.

11. The computer-implemented method of claim 1, wherein the watermark is visible to the user device, the computer-implemented method further comprising:
determining at least one of a location, a size, an orientation, or an aspect ratio of a text associated with the watermark; and
inserting the watermark into the document based on the at least one of the determined location, the size, the orientation, or the aspect ratio.

12. The computer-implemented method of claim 1, wherein the watermark is invisible to the user device, the computer-implemented method further comprising:
embedding the watermark into a hidden pattern or code that manipulates an image pixel of the document being viewed or accessed by the user device; and
inserting the hidden pattern or code associated with the watermark into the image pixel of the document.

13. A system, comprising:
a memory configured to store operations; and
one or more processors configured to perform the operations, the operations comprising:
enabling a screenshot protection action of a document, the screenshot protection action preventing a user device from at least taking a screenshot or sharing of sensitive information of the document;
transmitting the document with the screenshot protection action to the user device;
in response to receiving a consent from the user device, extracting a user identifier of the user device, the consent indicating that the user device will conform to the screenshot protection action when viewing or accessing the document;
generating a watermark in real-time based on the consent from the user device, the user identifier of the user device, and the screenshot protection action of the document; and
inserting the watermark into the document.

14. The system of claim 13, the operations further comprising:
detecting an event of the user device associated with the document;
storing the event of the user device into a database; and
monitoring, in a user interface, the event of the user device in the database, wherein the user interface supports filtering of the event based on at least a type of the event, the user device that triggers the event, or a time or a geographical location associated with the user device that triggers the event.

15. The system of claim 13, the operations further comprising:
transmitting a link to the user device for sharing another document, wherein the link supports the user device to select another screenshot protection action for the other document.

16. The system of claim 13, the one or more processors are further configured to perform the operations comprising:
generating a unique token for the document based on the screenshot protection action of the document; and
replacing the sensitive information of the document with the unique token that references the sensitive information of the document in a location within a database.

17. A non-transitory computer-readable storage device having instructions stored thereon, execution of which, by one or more processors, causes the one or more processors to perform operations comprising:
enabling a screenshot protection action of a document, the screenshot protection action preventing a user device from at least taking a screenshot or sharing of sensitive information of the document;
transmitting the document with the screenshot protection action to the user device;
in response to receiving a consent from the user device, extracting a user identifier of the user device, the consent indicating that the user device will conform to the screenshot protection action when viewing or accessing the document;
generating a watermark in real-time based on the consent from the user device, the user identifier of the user device, and the screenshot protection action of the document; and
inserting the watermark into the document.

18. The non-transitory computer-readable storage device of claim 17, wherein the operations further comprise:
detecting an event of the user device associated with the document;
storing the event of the user device into a database; and
monitoring, in a user interface, the event of the user device in the database, wherein the user interface supports filtering of the event based on at least a type of the event, the user device that triggers the event, or a time or a geographical location associated with the user device that triggers the event.

19. The non-transitory computer-readable storage device of claim 17, wherein the operations further comprise:
transmitting a link to the user device for sharing another document, wherein the link supports the user device to select another screenshot protection action for the other document.

20. The non-transitory computer-readable storage device of claim 17, wherein the operations further comprise:
generating a unique token for the document based on the screenshot protection action of the document; and
replacing the sensitive information of the document with the unique token that references the sensitive information of the document in a location within a database.

* * * * *